(12) United States Patent
Murtishaw

(10) Patent No.: US 6,629,631 B2
(45) Date of Patent: Oct. 7, 2003

(54) SOLDER IRON PRESSURE MONITOR AND METHOD OF USING SAME IN MANUFACTURING A CATHODE RAY TUBE

(75) Inventor: David Allen Murtishaw, Sun City, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/874,463

(22) Filed: Jun. 4, 2001

(65) Prior Publication Data

US 2002/0179677 A1 Dec. 5, 2002

(51) Int. Cl.[7] .............................. B23K 3/12; B23K 3/08; B23K 3/02
(52) U.S. Cl. ..................... 228/102; 228/103; 228/51; 228/54
(58) Field of Search ................... 228/102, 103, 228/51, 54; 348/834; 344/834, 844; 445/36

(56) References Cited

U.S. PATENT DOCUMENTS

| | | | | |
|---|---|---|---|---|
| 3,685,714 A | * | 8/1972 | Moyer et al. | 228/41 |
| 3,995,135 A | * | 11/1976 | Osipov et al. | 219/85.16 |
| 4,013,208 A | * | 3/1977 | Mason et al. | 228/20.1 |
| 4,031,612 A | * | 6/1977 | Nicolas | 29/564.4 |
| 4,229,136 A | * | 10/1980 | Panissidi | 414/673 |
| 4,236,306 A | * | 12/1980 | Hug et al. | 29/704 |
| 4,568,819 A | * | 2/1986 | Stacconi | 219/227 |
| 4,708,278 A | * | 11/1987 | Opfer | 228/122.1 |
| 4,832,246 A | * | 5/1989 | Ono et al. | 228/1.1 |
| 4,846,748 A | * | 7/1989 | Cote | 445/36 |
| 4,858,593 A | * | 8/1989 | Hsu | 126/413 |
| 4,864,723 A | * | 9/1989 | Griffith et al. | 29/846 |
| 5,446,261 A | * | 8/1995 | Hernandez et al. | 219/230 |
| 5,542,600 A | * | 8/1996 | Kobayashi et al. | 228/102 |
| 5,879,217 A | * | 3/1999 | Saito et al. | 348/824 |
| 5,894,409 A | * | 4/1999 | Tanaka | 361/749 |
| 6,139,389 A | * | 10/2000 | Dreyer et al. | 348/834 |
| 6,164,515 A | * | 12/2000 | Andrus et al. | 228/20.1 |
| 6,489,715 B1 | * | 12/2002 | Shen et al. | 313/463 |

FOREIGN PATENT DOCUMENTS

| | | | |
|---|---|---|---|
| DE | 4238100 A1 | * | 6/1993 |
| DE | 4328100 A1 | * | 6/1993 |

* cited by examiner

Primary Examiner—Tom Dunn
Assistant Examiner—L. Edmondson
(74) Attorney, Agent, or Firm—Steven L. Nichols

(57) ABSTRACT

A pressure gauge or monitor is attached to a soldering iron so that the pressure with which the iron is being applied can be precisely monitored. Such a pressure monitor on a soldering iron can be used to monitor the pressure applied with the soldering iron when forming a solder electrode on an anti-reflective film of a cathode ray tube. This allows such electrodes to be consistently and optimally formed for grounding the anti-reflective film.

22 Claims, 5 Drawing Sheets

SOLDER IRON PRESSURE MONITOR AND METHOD OF USING SAME IN MANUFACTURING A CATHODE RAY TUBE

FIELD OF THE INVENTION

The present invention relates to the fields of soldering and cathode ray tube manufacture. More specifically, the present invention relates to the use of soldering to create electrodes on the anti-reflective film of a cathode ray tube. The present invention provides a pressure gauge or monitor for a soldering iron so that the pressure applied to the iron when forming a solder electrode on an anti-reflective film of a cathode ray tube can be monitored and kept consistent from unit to unit within optimal parameters.

BACKGROUND OF THE INVENTION

Cathode ray tubes ("CRTs") are used in most television sets and computer and video monitors. A typical CRT is illustrated in FIG. 1. The CRT (100) is a glass tube with a bottle-like shape in which a relatively flat bottom portion (101) narrows into an elongated neck portion (102). The relatively flat portion (101) of the CRT (100) is the viewing surface and becomes the screen on which the display of the television set or monitor is generated when the CRT is incorporated therein.

An electro-luminescent material, such as phosphorus, that emits light when struck by an electron beam, is coated over the interior of the screen portion (101) of the CRT (100). An electron gun is then installed in the neck (102) of the CRT (100). A stream of electrons emitted from the electron gun is scanned over the electro-luminescent layer and turned on and off during the scanning to cause the electro-luminescent layer to glow in certain places and not others. In very simple terms, this is how an image is generated on the screen of a television or video monitor.

A yoke (not shown) is provided around the neck (102) of the CRT (100). This yoke produces a changing magnetic field through which the electron beam from the electron gun passes. The electron beam is deflected by the magnetic field of the yoke. Consequently, by varying the magnetic field created by the yoke in a precise cycle, the electron beam can be scanned, line-by-line, over the entire surface of the screen to generate video images thereon.

A cathode ray tube is generally constructed in the following matter. The neck (102) or funnel portion of the CRT (100) is formed open at both ends. Then the relatively flat bottom, or display portion (101) is sealed to the large end of the funnel and the electron gun is installed in the narrow end or neck of the funnel. The display portion (101) is sealed to the funnel (102) using frit. Frit is a glass paste that can be cured or hardened. Frit, in paste form, is applied around the large end of the funnel (102) between the funnel (102) and the display portion (101). The frit is then cured or hardened to form a frit seal between the funnel (102) and the display portion (101).

After the frit is sealed, the tube (100) is evacuated and a strong vacuum is maintained inside the tube (100) throughout its life. Because of the strong vacuum inside the tube (100), there is a minimal risk that the tube (100) could implode. This risk is, of course, heightened if the tube (100) is damaged or mishandled. In the event of an implosion, a major concern would be flying glass shrapnel produced by the implosion.

To minimize the risk of both an implosion and a resulting spray of shrapnel, a metal band (103) is wrapped around the cathode ray tube (100) over the frit seal. This band (103) is called a reinforcement or heat-shrinkage ("HS") band.

An anti-reflective film (104) is also applied over the viewing surface of the screen portion (101). This anti-reflective film (104) minimizes the reflection of external light from the screen (101) of the cathode ray tube (100). Such reflection degrades the quality of the image that can be displayed on the screen (101) of the tube (100).

The anti-reflective film (104) is in electrical contact with solder electrodes (105) that are formed on the film (104). During the operation of the cathode ray tube (100) as a television or video monitor, the anti-reflective film (104) is electrically grounded through the solder electrodes (105). This grounding prevents a build-up of an electric charge on the anti-reflective film (104). Such an accumulated charge can damage the anti-reflective film (104).

The solder electrodes (105) are electrically connected to the HS band (103) by a piece of conductive tape (106), as shown in FIG. 1. This conductive tape (106) provides an electrical path from the solder electrode (105) into the HS band (103) for purposes of grounding the anti-reflective film (104) of the surface of the screen (101).

The solder electrodes (105) are typically formed by a technician operating a solder iron. During the application of solder to the anti-reflective film (104) to form the solder electrodes (105), the technician applies pressure to the soldering iron to cause the solder to properly adhere to the anti-reflective film (104). If the technician applies too little or too much pressure, the quality of the solder bead and the resulting solder electrode (105) will be compromised.

If the solder electrode (105) is not properly formed and fails to adequately ground the anti-reflective film (104), i.e., release accumulated charge from the anti-reflective film (104), several negative consequences can result. First, the anti-reflective film (104) can be damaged. Secondly, the end user of the CRT is at risk of being shocked if he or she touches or comes too close to the screen (101) when a large accumulated charge is present and looking for a path to ground.

Consequently, there is a need in the art for a method and apparatus that helps ensure that the solder electrodes on the anti-reflective film of a cathode ray tube are properly formed. More specifically, there is a need in the art for a method and apparatus that monitors or controls the pressure applied to a solder bead when a solder electrode is being formed so as to keep that pressure consistent between units and within optimal parameters.

SUMMARY OF THE INVENTION

The present invention meets the above-described needs and others. Specifically, the present invention provides a method and apparatus that helps ensure that the solder electrodes on the anti-reflective film of a cathode ray tube are properly formed by that monitoring or controlling the pressure applied to a solder bead when a solder electrode is being formed so as to keep that pressure consistent between units and within optimal parameters.

Additional advantages and novel features of the invention will be set forth in the description which follows or may be learned by those skilled in the art through reading these materials or practicing the invention. The advantages of the invention may be achieved through the means recited in the attached claims.

The present invention may be embodied and described as a soldering iron in combination with a pressure monitor.

This novel device preferably includes a soldering iron having a soldering tip; and a pressure monitor mounted on the soldering iron, the pressure monitor monitoring the pressure with which the soldering iron is applied.

In a preferred embodiment, the pressure monitor includes a spring that is compressed in correspondence with the pressure of the soldering iron. The spring is preferably a coil spring surrounding the soldering tip.

A pressure platform is also preferably provided on the end of the spring. The pressure platform preferably provides roller bearings or some other member to prevent the spring from scratching the work-piece.

In one preferred embodiment, the pressure monitor includes a gauge with a needle that is deflected along a numeric scale in correspondence with compression of the spring. Alternatively, circuitry in the soldering iron may electronically produce a value indicative of the pressure in correspondence with compression of the spring. A display screen can then be included on the soldering iron for displaying the pressure value in numeric form.

In an automated embodiment, a robotic arm is used to position and apply the soldering iron to a work-piece. The robotic arm is controlled with a robotic arm controller.

This embodiment includes circuitry in the soldering iron to electronically produce a value indicative of the pressure in correspondence with compression of the spring. The pressure value produced by the circuitry is transmitted to the robotic arm controller, and the robotic arm controller controls the robotic arm and soldering iron in accordance with the pressure value.

The present invention also encompasses the methods of making and using the system described above. In particular, the soldering iron and pressure monitoring system of the present invention can be profitably used in forming solder electrodes on the anti-reflective film of a cathode ray tube. Specifically, the present invention encompasses a method of forming a solder electrode on an anti-reflective film of a cathode ray tube by monitoring a pressure applied with a soldering iron that is forming the solder electrode; and maintaining the pressure within a pre-determined optimal range.

The method of the present invention is preferably performed by compressing a spring on the soldering iron in correspondence with the pressure applied. As described above, this compression may be used for deflecting the needle of a pressure gauge along a numeric scale in correspondence with the compression of the spring. Alternatively, this compression may be used for electronically producing a value indicative of the pressure in correspondence with the compression of the spring. This pressure value may then be displayed in numeric form.

Finally, the method of the present invention may be applied to an automated process including positioning and applying the soldering iron to a work-piece with a robotic arm; controlling the robotic arm with a robotic arm controller; transmitting the pressure value to the robotic arm controller; and controlling the robotic arm and soldering iron with the robotic arm controller in accordance with the pressure value.

BRIEF DESCRIPTION OF THE DRAWINGS

The accompanying drawings illustrate preferred embodiments of the present invention and are a part of the specification. Together with the following description, the drawings demonstrate and explain the principles of the present invention.

Throughout the drawings, identical elements are designated by identical reference numbers.

DETAILED DESCRIPTION OF THE PREFERRED EMBODIMENTS

Stated in broad general principle, the present invention includes a pressure gauge or monitor attached to a soldering iron so that the pressure with which the iron is being applied can be precisely monitored. The present invention also includes a method of using such a pressure monitor on a soldering iron to monitor the pressure applied when forming a solder electrode on an anti-reflective film of a cathode ray tube. This allows such electrodes to be consistently and optimally formed for grounding the anti-reflective film.

Figure 1:
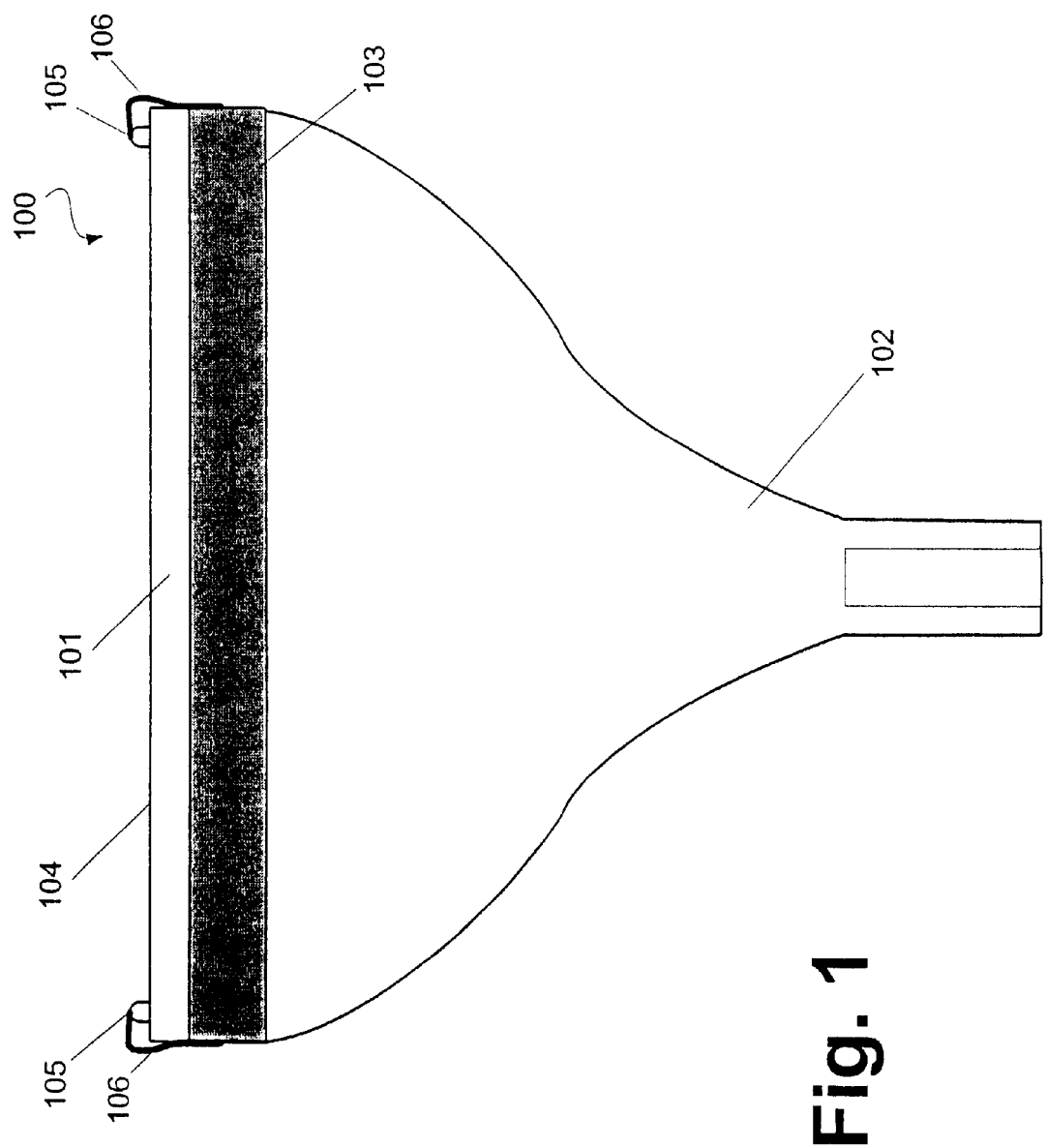
FIG. 1 is an illustration of a cathode ray tube to which the present invention is applied.
Figure 2:
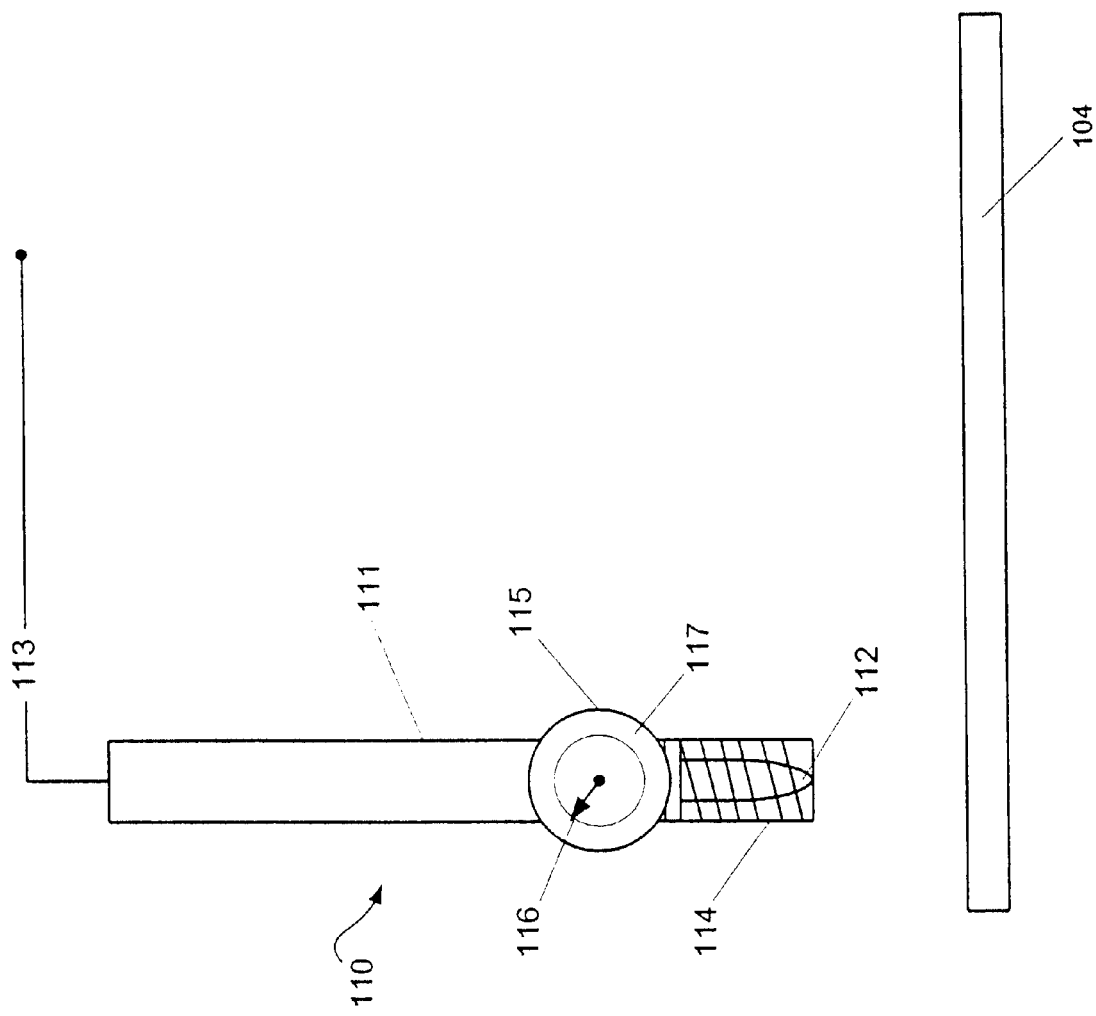
FIG. 2 is an illustration of a first embodiment of a solder iron pressure monitoring system according to the principles of the present invention.

Using the drawings, the preferred embodiments of the present invention will now be explained. FIG. 2 illustrates a first embodiment of the present invention in which a pressure gauge is incorporated with a soldering iron. As shown in FIG. 2, the soldering iron (110) includes a handle portion (111) and a heated tip portion (112). An electric current is provided over a connection (113). The current is used to heat the tip (112) to a temperature that will melt solder, thereby allowing the soldering iron to liquefy, deposit, manipulate and shape a solder bead.

The soldering iron (110) of the present invention includes a pressure gauge or monitor that monitors the pressure with which the soldering iron (110) is applied. This pressure gauge is preferably composed as follows.

A spring (114) is placed around the tip (112) of the soldering iron (110). This spring (114) may extend slightly beyond the tip (112) and will be compressed as the tip (112) is forced against a work-piece, such as the anti-reflective film (104) on a cathode ray tube. The greater the pressure on the soldering iron (110), the greater the compression of the spring (114).

The spring (114) is in contact with a gauge (115). Using known techniques, the compression of the spring (114) is translated into deflection of a needle (116) of the gauge (115). The greater the compression of the spring (114), the greater the deflection of the needle (116).

A numeric scale (117) can also be provided on the face of the gauge (115). This scale (117) is calibrated with the pressure required to compress the spring (114) by a given amount and the corresponding deflection of the needle (116).

Consequently, by looking at where the deflected needle (116) points to on the scale (117), the pressure being applied with the soldering iron (110) can be determined by the technician operating the soldering iron (110). In this way, the technician can ensure that the pressure with which the soldering iron (110) is applied is within an optimal range for forming a solder electrode on the anti-reflective film (104) of a cathode ray tube. The technician can also ensure that a relatively consistent amount of pressure is applied to each electrode being formed. This consistency allows for more reliability in the electrodes formed.

Figure 3:
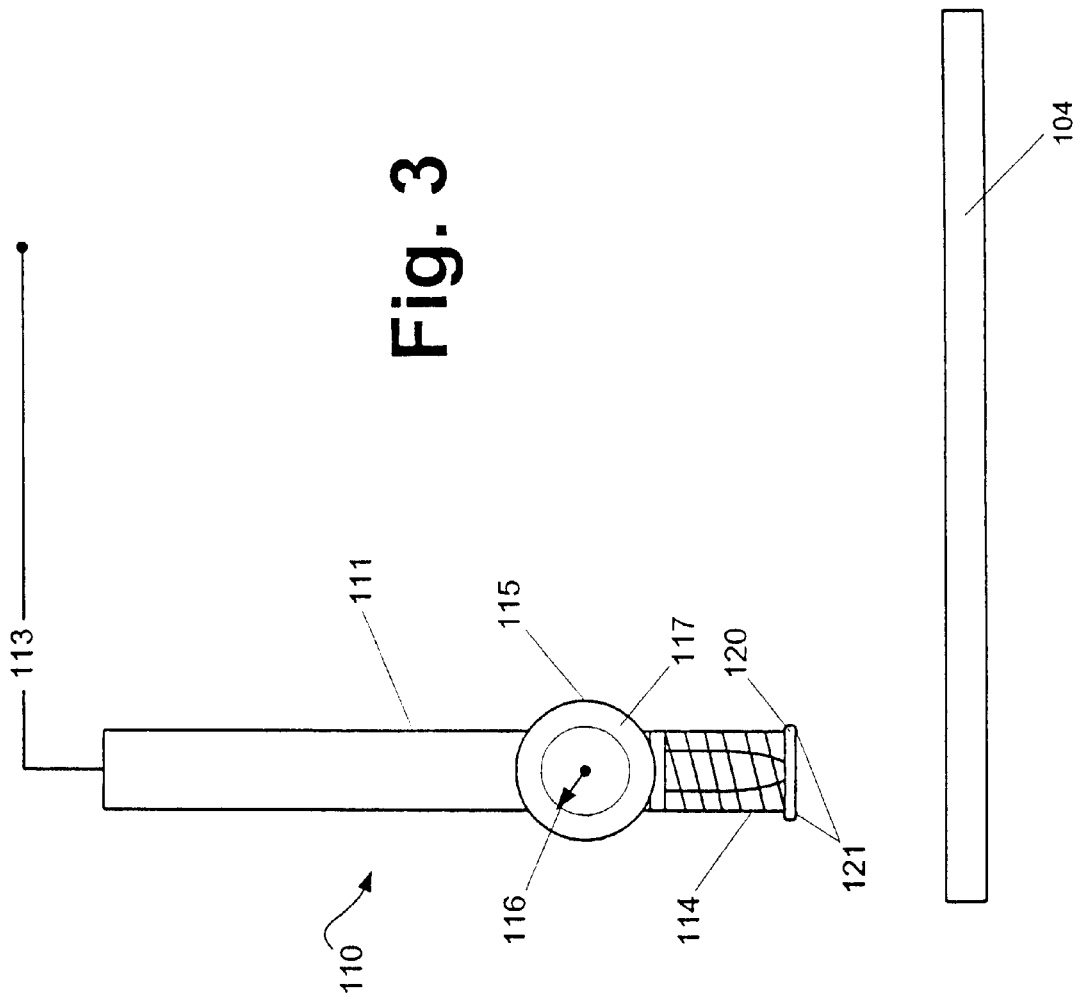
FIG. 3 is an illustration of a second embodiment of a solder iron pressure monitoring system according to the principles of the present invention.

FIG. 3 illustrates a second preferred embodiment of the present invention. This embodiment is substantially similar to that illustrated in FIG. 2 with the addition of a pressure platform (120) at the end of the spring (114).

The pressure platform (120) serves two functions. First, the pressure platform defines the end of the spring (114) and movement of the pressure platform (120) constitutes compression of the spring (114).

More importantly, the pressure platform (120) preferably includes a number of roller bearings (121). These roller bearings (121) become the physical interface between the anti-reflective film (104) and the pressure gauge (114, 115) of the soldering iron (110). The roller bearings (121) perform the important function of preventing the spring (114) from scratching the anti-reflective film (104) when the soldering iron (110) is applied to form a solder electrode on the film (104).

Alternatively, a padded or smoothed, rounded surface could be used in place of the roller bearings (121) as the physical interface between the anti-reflective film (104) and the pressure gauge (114, 115) of the soldering iron (110). Any such member can eliminate or minimize potential damage to the anti-reflective film (104)

Figure 4:
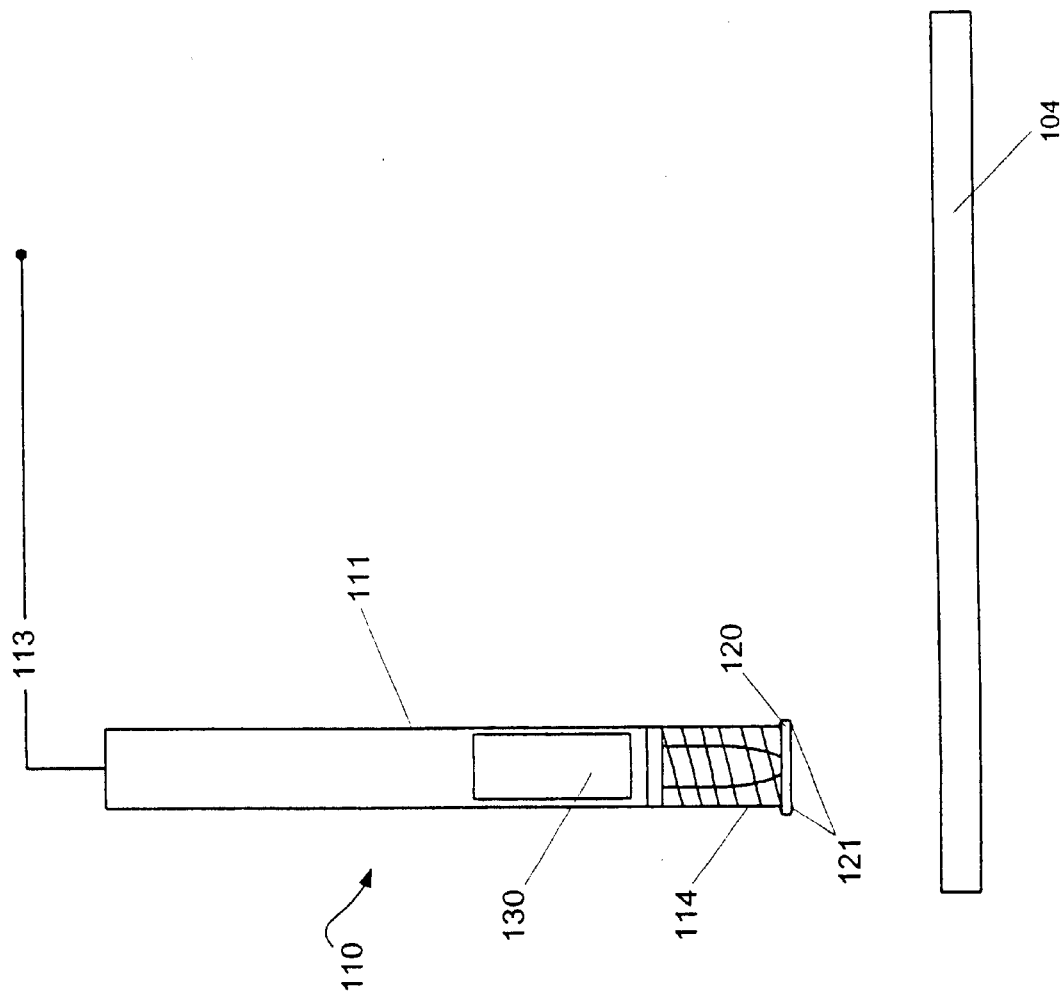
FIG. 4 is an illustration of a third embodiment of a solder iron pressure monitoring system according to the principles of the present invention.

FIG. 4 illustrates a third embodiment of the present invention. In this embodiment, the pressure gauge of previous embodiment is replaced with a digital pressure monitor.

As shown in FIG. 4, a display screen (130) is provided on the soldering iron (110). This screen (130) may be, for example, a light-emitting diode display or a liquid crystal display. In either case, circuitry (See FIG. 5) within the soldering iron (110) translates the compression of the spring (114) into a digital measure of the compression, i.e., a digital measure of the pressure with which the soldering iron (110) is being applied. This circuitry then drives the display screen (130) to provide a numeric reading of the pressure applied.

A digital pressure monitor (130) can more precisely display and convey the pressure being measured to a technician operating the soldering iron (110). Consequently, the technician is then better able to keep the pressure within optimal parameters.

As illustrated in FIG. 4, use of a pressure deck (120) and roller bearings (121) with this embodiment is preferred, but not required. The pressure deck (120) and roller bearings (121) provide the same advantages in this embodiment as described above.

Figure 5:
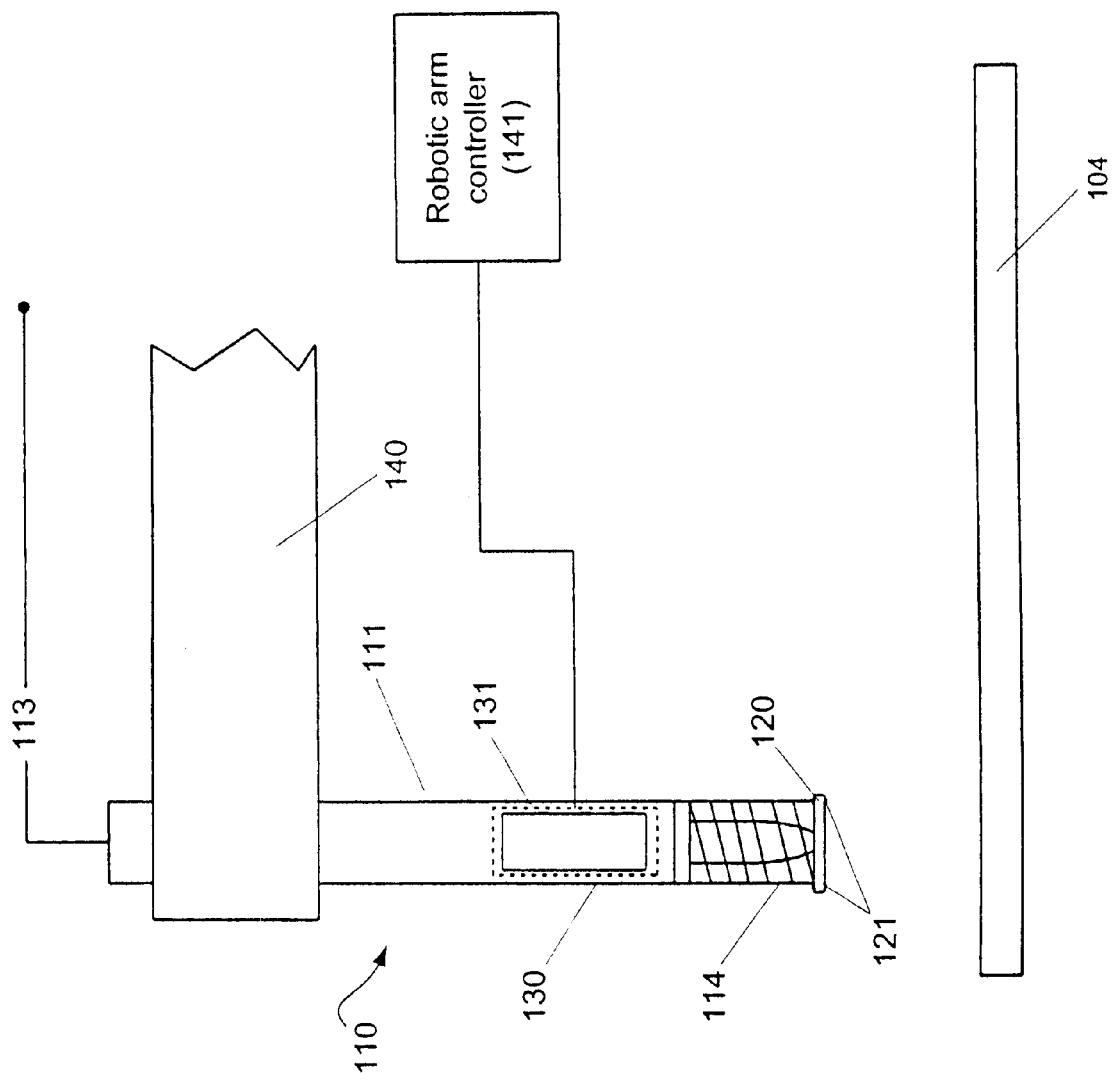
FIG. 5 is an illustration of a fourth embodiment of a solder iron pressure monitoring system according to the principles of the present invention.

FIG. 5 illustrates a fourth preferred embodiment of the present invention in which the soldering iron (110) is incorporated into a robotic system so that the soldering and formation of solder electrodes on the anti-reflective film (104) can be automated. As shown in FIG. 5, the soldering iron (110) is now held by a robotic arm (140). Using known principles of robotics, the arm (140) is driven and controlled by a robotic arm controller (141).

The robotic arm controller (141) controls the position of the arm (140) and soldering iron (110) with respect to the anti-reflective film (104). The robotic arm controller (141) also controls the pressure with which the soldering iron (110) is pressed by the arm (140) against the anti-reflective film (104).

As in the previous embodiment, circuitry (shown in ghost at (131)) within the soldering iron (110) converts the compression or deflection of the spring (114) into a digital value corresponding to the pressure with which the iron (110) is pressed against the anti-reflective film (104) and molten solder. This value can be displayed on the display (130), however the display (130) is not required in the automated embodiment of FIG. 5.

Rather, the digital value of the pressure is transmitted to the robotic arm controller (141) as shown in FIG. 5 to create a feedback loop. Consequently, the robotic arm controller (141) can maintain an optimal pressure on the soldering iron (110) during soldering, and specifically, during the formation of a solder electrode on the anti-reflective film (104).

As illustrated in FIG. 5, the use of a pressure deck (120) and roller bearings (121) with this embodiment is preferred, but not required. The pressure deck (120) and roller bearings (121) provide the same advantages in this embodiment as described above.

The preceding description has been presented only to illustrate and describe the invention. It is not intended to be exhaustive or to limit the invention to any precise form disclosed. Many modifications and variations are possible in light of the above teaching.

For example, a compression member other than the coil spring illustrated in the figures can be used to measure the pressure on the soldering iron. Any member with a spring constant that can be compressed and then returned to an original state can be used to measure the pressure on the soldering iron.

Additionally, the spring or other compression member can be located along a side of the soldering iron tip rather than the configuration illustrated in the figures. However, such a lateral configuration will not be as accurate if the soldering iron is angled. Angling the soldering iron could exaggerate or prevent compression of the pressure-measuring member. Consequently, a coil spring surrounding the solder iron tip is a preferred embodiment of the present invention.

The preferred embodiments were chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A soldering iron in combination with a pressure monitor, said combination comprising:
   a soldering iron having a soldering tip; and
   a pressure monitor mounted on said soldering iron, said pressure monitor monitoring a pressure with which said soldering iron is applied;
   wherein said pressure monitor comprises a spring that is compressed in correspondence with said pressure of said soldering iron; and
   wherein said pressure monitor further comprises a gauge with a needle that is deflected along a numeric scale in correspondence with compression of said spring.

2. The combination of claim 1, wherein said spring is a coil spring surrounding said soldering tip.

3. The combination of claim 1, further comprising a pressure platform on an end of said spring, said pressure platform comprising roller bearings to prevent said spring from scratching a work-piece.

4. The combination of claim 1, wherein said pressure monitor further comprises circuitry for electronically producing a value indicative of said pressure in correspondence with compression of said spring.

5. The combination of claim 4, further comprising a display screen for displaying said value in numeric form.

6. The combination of claim 4, further comprising:
   a robotic arm for positioning and applying said soldering iron to a work-piece; and
   a robotic arm controller for controlling said robotic arm;
   wherein said pressure value produced by said circuitry is transmitted to said robotic arm controller and said robotic arm controller controls said robotic arm and soldering iron in accordance with said pressure value.

7. A method of forming a solder electrode on an anti-reflective film of a cathode ray tube, said method comprising:
   monitoring a pressure applied with a soldering iron that is forming said solder electrode; and
   maintaining said pressure within a pre-determined optimal range;
   wherein said monitoring said pressure further comprises compressing a spring on said soldering iron in correspondence with said pressure applied; and
   wherein said monitoring said pressure further comprises deflecting a needle of a pressure gauge along a numeric scale in correspondence with compression of said spring.

8. The method of claim 7, wherein compressing said spring further comprises providing a coil spring surrounding said soldering tip that is compressed in correspondence with said pressure applied.

9. The method of claim 7, further comprising preventing damage to a work-piece by providing a pressure platform on an end of said spring, said pressure platform comprising roller bearings.

10. The method of claim 7, wherein said monitoring said pressure further comprises electronically producing a value indicative of said pressure in correspondence with compression of said spring.

11. The method of claim 10, further comprising displaying said pressure value in numeric form.

12. The method of claim 10, further comprising:
    positioning and applying said soldering iron to a work-piece with a robotic arm;
    controlling said robotic arm with a robotic arm controller;
    transmitting said pressure value to said robotic arm controller; and
    controlling said robotic arm and soldering iron with said robotic arm controller in accordance with said pressure value.

13. A device for forming a solder electrode on an anti-reflective film of a cathode ray tube, said device comprising:
    means for monitoring a pressure applied with a soldering iron that is forming said solder electrode, wherein said means for monitoring said pressure further comprises a spring on said soldering iron that is compressed in correspondence with said pressure applied;
    means for maintaining said pressure within a pre-determined optimal range; and
    means for visually indicating said pressure based on compression of said spring, wherein said visual indication means further comprises a needle of a pressure gauge deflected along a numeric scale in correspondence with compression of said spring.

14. The device of claim 13, wherein said visual indication means further comprise:
    circuitry for generating a pressure value in correspondence with compression of said spring; and
    a display device for numerically displaying said pressure value.

15. The device of claim 13, further comprising means for preventing damage to a work-piece.

16. The device of claim 15, wherein said damage prevention means include a pressure platform on an end of said spring, said pressure platform comprising roller bearings.

17. A method of forming a solder electrode on an anti-reflective film of a cathode ray tube, said method comprising:
    forming an anti-reflective film on a cathode ray tube;
    with a soldering iron, forming a solder electrode on said film;
    monitoring a pressure applied by said soldering iron that is forming said solder electrode; and
    maintaining said pressure within a pre-determined optimal range based on said monitoring;
    wherein said monitoring said pressure further comprises compressing a spring on said soldering iron in correspondence with said pressure applied; and
    wherein said monitoring said pressure further comprises deflecting a needle of a pressure gauge along a numeric scale in correspondence with compression of said spring.

18. The method of claim 17, wherein compressing said spring further comprises providing a coil spring surrounding said soldering tip that is compressed in correspondence with said pressure applied.

19. The method of claim 17, further comprising preventing damage to a work-piece by providing a pressure platform on an end of said spring, said pressure platform comprising roller bearings.

20. The method of claim 17, wherein said monitoring said pressure further comprises electronically producing a value indicative of said pressure in correspondence with compression of said spring.

21. The method of claim 20, further comprising displaying said pressure value in numeric form.

22. The method of claim 20, further comprising:
    positioning and applying said soldering iron to a work-piece with a robotic arm;
    controlling said robotic arm with a robotic arm controller;
    transmitting said pressure value to said robotic arm controller; and
    controlling said robotic arm and soldering iron with said robotic arm controller in accordance with said pressure value.

* * * * *